Aug. 13, 1957　　　S. M. CLARK　　　2,802,507
BEAD LOCK TIRE RIM
Filed July 28, 1955　　　2 Sheets-Sheet 2
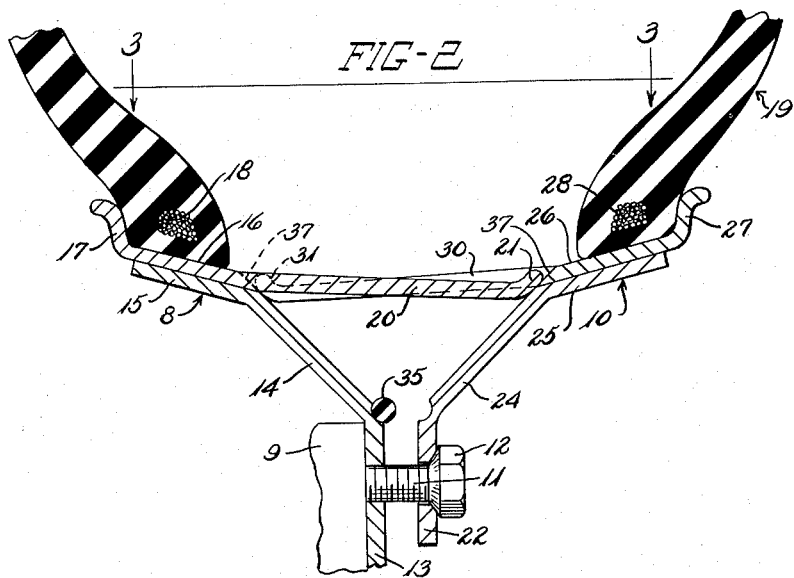
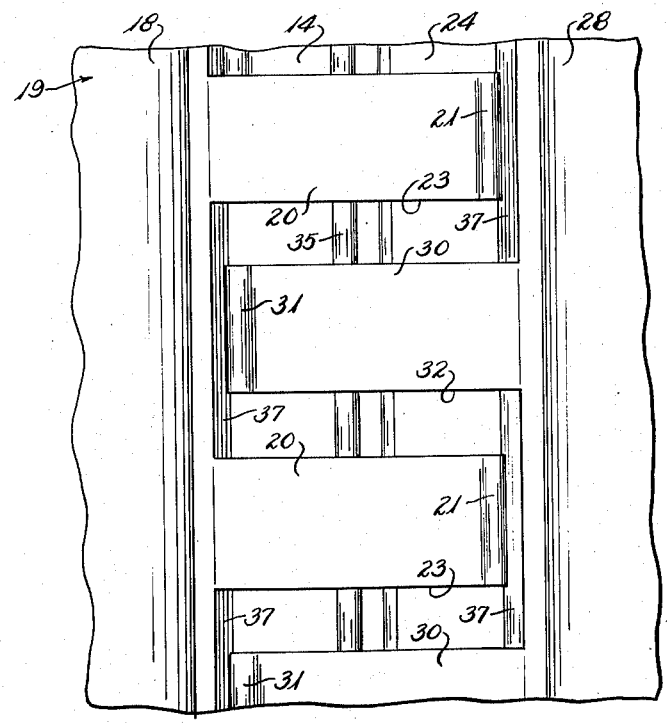
INVENTOR.
STANLEY M. CLARK
BY
W. A. Fraser
ATTY.

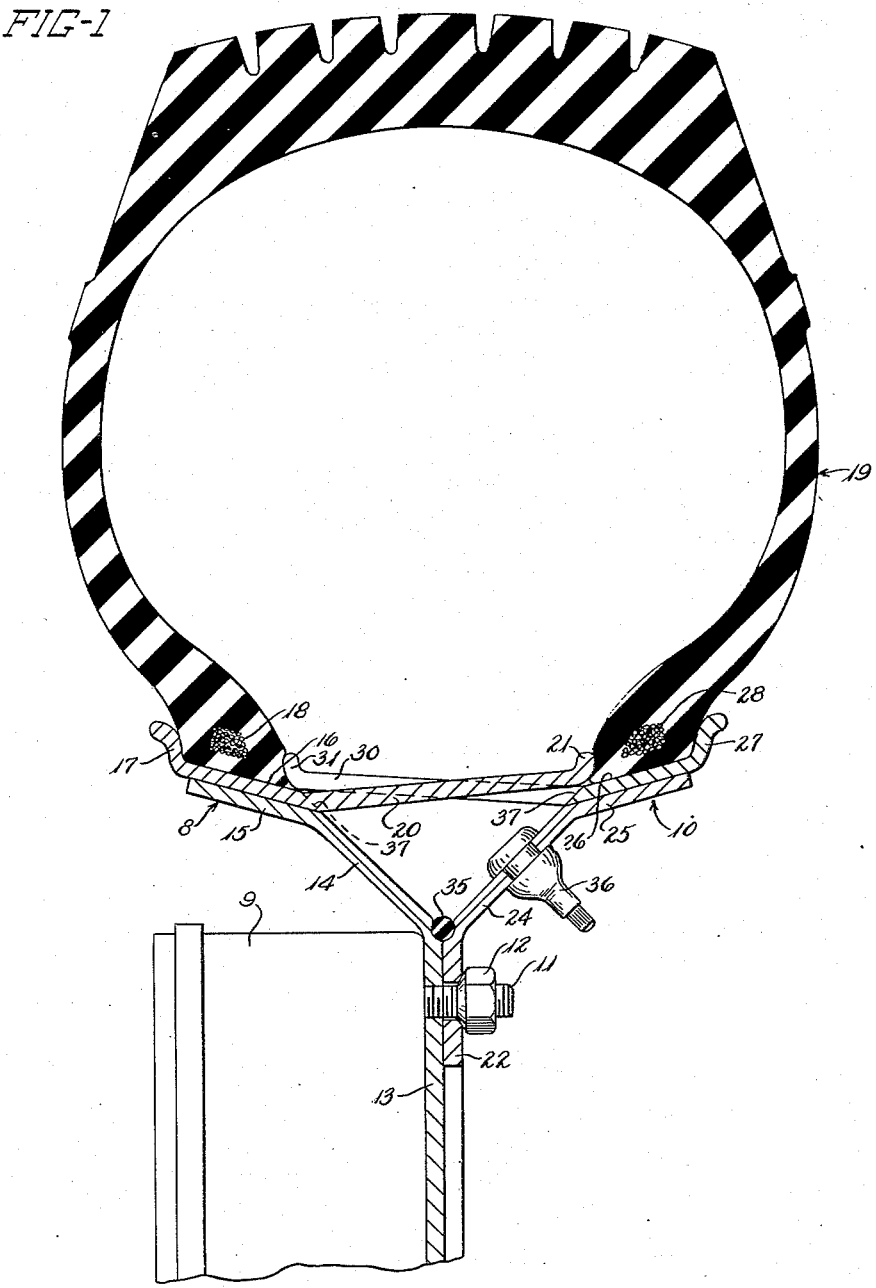

United States Patent Office 2,802,507
Patented Aug. 13, 1957

2,802,507
BEAD LOCK TIRE RIM

Stanley M. Clark, Parma, Ohio, assignor to The Firestone Tire & Rubber Company, Akron, Ohio, a corporation of Ohio Application July 28, 1955, Serial No. 524,868

6 Claims. (Cl. 152—401)

This invention relates to rims for automotive vehicles and more particularly to a rim having integral means for locking the beads of a tire in position on the rim.

It is often desirable to hold the beads of a tire concentric and in position so that the vehicle can be driven on the tire after it has gone flat. This is particularly true in military applications where continued movement may be more important than any other factor. Heretofore the beads of a tire have been held or locked in place by one of the so-called bead locks which comprise a separate member generally in the form of a cylindrical sleeve which is inserted between the beads of a tire before it is mounted on a rim. These bead locks are difficult to use and have not proven entirely satisfactory, for such a member represents one more separate piece to handle and it is easily lost or misplaced.

According to the present invention, means integral with the rim are provided to lock the beads of a tire in place when the rim and tire are fully assembled. In its preferred form the rim comprises two parts with intermeshing locking fingers on each part adapted to hold the beads in place. The fingers normally have a retracted position enabling the tire to be easily mounted on the rim but in the final assembly of the rim the fingers are forced into locking position by reaction with a camming surface on the other part of the rim. By such a construction a positive bead lock is obtained while at the same time assembly of tire and rim is facilitated.

It is accordingly an object of the invention to provide a rim having a bead lock substantially integral with the rim and which functions automatically upon assembly of the rim. A more specific object is to provide a bead lock comprising sets of intermeshing fingers adapted to contact and hold the beads of a tire in position on their bead seats when the tire is deflated. Other objects are to provide a rim and bead lock construction which is cheap and easy to make, which is sure in operation, and which is convenient to use.

These and further objects and advantages will be more fully apparent from the following description of the invention, reference being had to the accompanying drawing in which:

Figure 1 is a view, partly in radial section, of a rim embodying the invention showing the rim with a tubeless tire mounted thereon in final assembled position;

Figure 2 is a fragmentary view similar to Figure 1 showing the parts before final assembly, just as the locking fingers are about to be cammed into locking position; and Figure 3 is a fragmentary view taken in the plane indicated by the lines 3—3 of Figure 2.

The present invention is illustrated with respect to a tubeless truck tire, particularly one adapted for use on a military vehicle, but it is to be understood that the principles of construction can be used with any automotive vehicle and any tire. In the present example, the essential parts of the rim are shown to be symmetrical but it is to be understood that the same principle may be used and the same mode of operation may be obtained with rims of unsymmetrical construction.

As shown in Figure 1, the preferred form of a rim embodying the invention comprises a part indicated generally at 8 which is adapted to be fixedly secured by welding or otherwise to a brake drum 9, and a second part 10 which is adapted to be assembled with part 8 by means of a suitable number of circumferentially spaced bolts 11 and nuts 12. The part 8 comprises a radial flange portion 13 which extends outwardly just beyond the brake drum and then flares outwardly in a conical portion 14 which terminates in an angularly directed flange 15 as shown at the left of Figure 1. Flange 15 comprises a support for a separately formed bead seat 16 which is secured, as by brazing or welding, in an airtight seal to the flange 15. The seat 16 terminates at its outer edge in a side flange 17 and together with the flange supports the bead 18 of a tubeless tire 19 mounted on the rim. The seat portion 16 at its inner circumferential edge is provided with a plurality of integrally formed axially extending, circumferentially spaced fingers 20 which terminate in outwardly turned, slightly curved tips 21. The fingers 20 are separated by notches 23 which are substantially wider than the width of the fingers, see Figure 3. Preferably the fingers 20 have a width in the order of about ½ inch and the notches a width of about 1½ to 2 inches.

As stated above, the part 10 is in most respects similar to the part 8, having a radial flange portion 22 which is drilled to receive the bolts 11 and which flares outwardly in a conical portion 24 and an angularly directed flange 25. The portion 24 and flange 25 are similar in all respects to the conical flange portions 15 and 16 respectively differing only in being opposite in angle. The flange 25 supports a bead seat 26 which is secured thereto in a manner providing an air-tight seal, such as by a continuous circumferential weld. The seat 26 terminates in an outer side flange 27 and with the flange supports the other bead 28 of tire 19, and the seat 26 has at its inner circumferential edge a plurality of integrally formed circumferentially spaced fingers 30 identical to the fingers 20 and terminating outwardly curved tip portions 31. The fingers 30 are spaced apart by notches 32 which are substantially greater in width than the fingers 30, being about 1½ to 2 inches wide.

Normally the fingers 20 and 30 take a position indicated in Figure 2 with the tips 21 and 31 lying in circles the diameters of which are slightly smaller than the internal diameters of the beads 18 and 28. This facilitates moving the tire beads over the fingers and onto the bead seats during the mounting of the tire. In order to mount the tire on the rim, the part 10 is removed bodily from the wheel and the tire bead 18 is manually forced inwardly upon the bead seat 16 and into abutment with the side flange 17. The part 10 is then forced onto the tire bead 28 until the bead is seated upon seat 26 in contact with the side flange 27. The part 10 is then manually forced axially inwardly toward the part 8 with the fingers 30 fitting into the notches 23 and intermeshing with the fingers 20 which fit into notches 32. Figure 2 shows the stage in the assembly operation, when the fingers are still in their normal position and with their tips 21 and 31 first engaging the conical surfaces 14 and 24 respectively. Further movement of the part 10 inwardly upon the wheel, from the position of Figure 2 toward the left as viewed, will cause the conical surfaces 14 and 24 to cam the fingers 20 and 30 radially outwardly causing them to ride outwardly and upon the bead seats 16 and 26 with the finger tips coming into contact with the beads 18 and 28. The last increment of movement of part 10 causes the fingers 20 and 30 to forcibly engage the tire beads and urge them tightly against the side flanges positively locking the beads in position upon the rim. In this last increment of movement, also, a sealing gasket 35 which is positioned in circumferential notches in parts 8 and 10 is compressed to provide an air-tight seal of the tire and rim assembly. A conventional inflation valve 36 permits the tire to be inflated after the part 10 is drawn tight. In service, if the tire develops a puncture or blow out, the beads will remain locked in position and the tire will remain concentric on the rim permitting the vehicle to be driven on the deflated tire.

The device has the advantages of providing a positive locking of both beads while enabling rapid and easy mounting of a tire on the rim. A minimum number of rim parts, and only one removable part is used.

There is some advantage in manufacture, to have the parts 8 and 10 substantially symmetrical in form. This is of course not necessary, provided the rim has suitable camming surfaces to actuate the fingers or other means which are used to lock the beads in place. If symmetrical parts are used it might be advantageous at times to have the part 8 removable from the wheel also, and in that case the parts 8 and 10 may be completely interchangeable, and the tire may be more readily assembled with the rim.

Preferably the bead seat 16 and 26 extend at an angle of about 15° to the axis of the rim and the beads 18 and 28 are molded to have a tight compression fit with the bead seats. In such case, most of the load of the tire is carried by the reaction of the tire beads with the bead seats and only a slight portion of the load is taken up by the side flanges 17 and 27. Accordingly, the bead seats 16 and 26, the side flanges 17 and 27 and the fingers 20 and 30 need not have any great inherent strength for the side flanges and fingers are not subjected to heavy loads and the bead seats themselves are well supported by the underlying flanges 15 and 25.

It should be noted that the fingers 20 and 30 have their root portions at about the juncture of the conical surfaces 14 and 24 with the adjacent bead seats. If desired, the edges of the notches may be slightly chamfered as indicated at 37 to enable the fingers to ride easily up and onto the bead seats. This is not necessary, however, particularly when the tips of the fingers are well rounded or when the bead seats are of relatively thin gauge material.

The rim is most advantageously used when the tips of the fingers are expandable by contact with the camming surfaces of the rim parts. Such a feature provides great convenience in mounting the tire and in assembling the rim. However, it may be desired to have the fingers extend substantially axially from the bead seats with the tips of the fingers normally taking the radial position which is required to hold the tire beads on their seats, without the necessity of expanding them outwardly. In such case the natural resilience of the fingers must be utilized to mount the tire on the rim contracting the fingers manually to permit the tire beads to telescope over the fingers and seat upon the bead seats.

Various modifications will occur to those skilled in the art without departing from the spirit and scope of the invention, the essential features of which are summarized in the claims below:

What is claimed is:

1. A rim comprising a part having a bead seat and a side flange, and a second part having a second bead seat and a second side flange; and a set of circumferentially spaced fingers extending axially from each bead seat toward the other bead seat, with the fingers of one set intermeshing with the fingers of the other set and with the tips of said fingers extending axially over said bead seats a slight distance to maintain the beads of a tire mounted on said rim, in position on said bead seats.

2. A rim comprising a part having a bead seat and a side flange and an outwardly inclined conical surface terminating adjacent said bead seat, and a second part having a second bead seat and side flange and having a second conical surface terminating adjacent said second bead seat and flaring outwardly at an angle opposite said first conical surface; and a set of circumferentially spaced fingers extending axially from each bead seat toward the other bead seat, with the fingers of one set intermeshing with the fingers of the other set and with the tips of said fingers normally lying in circles of smaller diameter than the diameter of said bead seats, said sets of fingers being adapted to contact said conical surfaces respectively whereby when said parts are drawn together into assembled position, the tips of said fingers are expanded outwardly by contact with said conical surfaces to lie in circles having diameters greater than said bead seat diameter and to take a position with the tips of said fingers extending axially over said bead seats a slight distance.

3. A rim comprising a pair of parts symmetrical about a plane transverse the axis of said rim each part having a radial flange supporting an outwardly inclined conical surface which terminates in a bead seat and a side flange, and a set of circumferentially spaced fingers extending axially from adjacent the bead seat of each part toward the bead seat of the other part, with the fingers of one set intermeshing with the fingers of the other set and with the tips of said fingers normally lying in circles of smaller diameter than the diameter of said bead seats, the set of fingers of one part being adapted to contact the said conical surface of the other part whereby when said parts are drawn axially together into assembled position, the tips of said fingers are expanded radially outwardly by contact with said conical surfaces to lie in circles having diameters greater than said bead seat diameter and to take a position with the tips of said fingers extending axially over said bead seats.

4. A rim comprising a part having a radial flange supporting an outwardly inclined conical surface which terminates in a bead seat and a side flange, and a second part comprising a radial flange adapted to be removably secured to said first flange, said second part flaring outwardly to form a second conical surface extending at an angle opposite said first conical surface, said second conical surface terminating in a second bead seat and a second side flange; and a set of circumferentially spaced fingers extending axially from adjacent each bead seat toward the other bead seat, with the fingers of one set intermeshing with the fingers of the other set and with the tips of said fingers normally lying in circles of smaller diameter than the diameter of said bead seats, said sets of fingers being adapted to contact said conical surfaces respectively whereby when said parts are drawn together into assembled position, the tips of said fingers are expanded outwardly by contact with said conical surfaces to lie in circles having diameters greater than said bead seat diameter and to take a position with the tips of said fingers extending axially over said bead seats respectively a slight distance.

5. A rim comprising an uninterrupted part having a bead seat and side flange, and a second part having a second uninterrupted bead seat and a second side flange; and means fixedly attached to and extending axially from each said part adjacent the bead seat thereof toward the bead seat of said other part and extending axially over said bead seats a slight distance whereby to maintain the beads of a tire in position on said bead seats.

6. Apparatus according to claim 5 in which said means comprises a set of stiffly resilient metallic fingers capable of deflection in the radial direction and in which the fingers of one set intermesh with the fingers of the other set.

References Cited in the file of this patent

UNITED STATES PATENTS 2,381,382    Hale _____ Aug. 7, 1945